July 26, 1927.

G. F. SEIDEL ET AL 1,636,872

DIPPING SHACKLE

Filed May 9, 1927

G. F. Seidel
F. O. Salts
L. E. Whitcomb

Inventors

By C. A. Snow & Co.

Attorneys.

Patented July 26, 1927.

1,636,872

UNITED STATES PATENT OFFICE.

GEORGE F. SEIDEL, FRITZ O. SALTS, AND LOUIS E. WHITCOMB, OF FREMONT, NEBRASKA.

DIPPING SHACKLE.

Application filed May 9, 1927. Serial No. 190,028.

This invention relates to a shackle designed primarily for use in dressing poultry.

One of the objects of the invention is to provide a shackle for securely holding several fowls in position for successive operations after which they can be simultaneously dipped, and finally conveyed to another point for further operations.

Another object is to provide a structure of this character which is simple, durable and compact in construction and especially suited for use in plants where poultry dressing operations are carried on, on a large scale.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings, the preferred form of the invention has been shown.

In said drawings.

Figure 1:
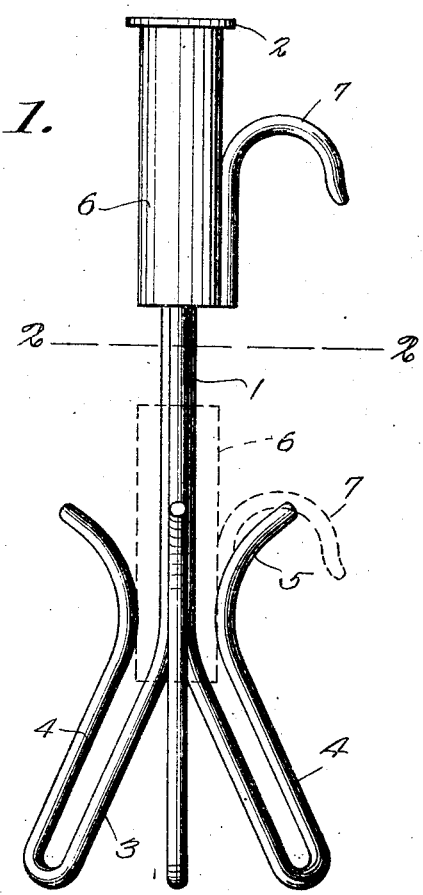
Figure 1 is an elevation of the shackle, one position of the retaining sleeve being indicated by broken lines.
Figure 2:
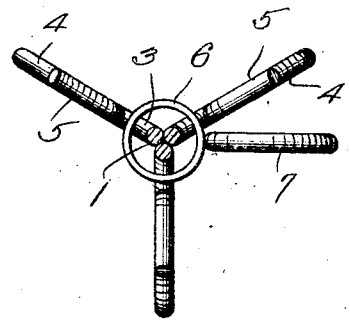
Figure 2 is a section on line 2—2, Figure 1, the sleeve being shown in its lowermost position.

Referring to the figures by characters of reference 1 designates a shank formed preferably of three rods welded or otherwise connected together and provided, at one end, with a disk-like head 2. The lower portions of the rods diverge downwardly as at 3 and are bent backwardly and upwardly to provide elongated loops 4 the free ends of which are outturned to form curved bills 5. A sleeve 6 is slidably mounted on the shank 1 and has a hook 7 extending therefrom. The head constitutes means for limiting the sliding movement of the sleeve 6.

In practice three fowls to be dressed are suspended from the shackle, the legs being slipped into the loops or hooks 4. This shackle is supported at a point where the shank 1 can be rotated readily in the sleeve and where the fowls can be easily reached by three persons. The first person kills the fowls, the next removes the wing and tail feathers while the third attendant lifts the shackle from the rotatable wheel used for supporting a number of the shackles and dips the shackle in the scalding vat. Before doing this he releases the sleeve 6 so that it will move downwardly substantially to the position indicated by broken lines in Figure 1 so as to prevent the fowls from becoming disconnected from the shackle. After the shackle has been removed from the scalding vat the hook 7 is placed in engagement with a rod or other support on which it can slide easily and will move to another position where the next operations can be performed.

The shackle constituting this invention has been found very useful in plants where large quantities of poultry are handled and can be used where either the dry scalding or the old style scalding methods are employed.

The wheel used for supporting a number of shackles so that they can be successively reached by the attendants during the killing and picking operations described has not been shown because it does not constitute any part of the present invention.

What is claimed is:

1. A shackle of the class described including a shank, poultry supporting loops at one end of the shank, a retaining sleeve slidable on the shank into and out of the loops, and a support engaging member carried by the sleeve.

2. A shackle of the class described including a shank having a head at one end and downwardly diverging loops at its other end, each loop opening upwardly and having an outturned bill, and a retaining sleeve slidable on the shank into and out of the open ends of the loops.

3. A shackle of the class described including a shank having a head at one end and downwardly diverging loops at its other end, each loop opening upwardly and having an outturned bill, a retaining sleeve slidable on the shank into and out of the open ends of the loops, said head constituting a stop for the sleeve, and a support engaging member extending from the sleeve.

In testimony that we claim the foregoing as our own, we have hereto affixed our signatures.

GEORGE F. SEIDEL.
FRITZ O. SALTS.
LOUIS E. WHITCOMB.